Nov. 6, 1945.   F. CARTLIDGE   2,388,385
MATERIAL GATHERING AND LOADING MACHINE
Filed Aug. 2, 1943   11 Sheets-Sheet 1

Fig. 1

INVENTOR
Frank Cartlidge
Clarence F. Bole
ATTORNEY

Nov. 6, 1945.                F. CARTLIDGE                2,388,385
             MATERIAL GATHERING AND LOADING MACHINE
                 Filed Aug. 2, 1943        11 Sheets-Sheet 6

INVENTOR
Frank Cartlidge
Clarence F. Poole
ATTORNEY

Fig. 7

Nov. 6, 1945.   F. CARTLIDGE   2,388,385
MATERIAL GATHERING AND LOADING MACHINE
Filed Aug. 2, 1943   11 Sheets-Sheet 9

INVENTOR
Frank Cartlidge
Clarence F. Poole
ATTORNEY

Patented Nov. 6, 1945

2,388,385

UNITED STATES PATENT OFFICE 2,388,385

MATERIAL GATHERING AND LOADING MACHINE

Frank Cartlidge, Chicago, Ill., assignor to Goodman Manufacturing Company, Chicago, Ill., a corporation of Illinois Application August 2, 1943, Serial No. 497,004

16 Claims. (Cl. 198—8)

This invention relates to improvements in material gathering and loading machines particularly adapted to load coal at the working face of a mine underground.

The principal objects of my invention are to provide a new and improved simple and efficient loading machine of a low overall height suitable for operation in thin seams of coal and arranged with a view towards increased maneuverability and capacity, together with increased accessibility to the operating parts of the machine, and compactness and simplicity in construction.

Other objects of my invention will appear from time to time as the following specification proceeds and with reference to the accompanying drawings wherein.

Referring now to the details of the embodiment of my invention illustrated in the drawings, the main elements of the machine consist of a main frame 10 mounted on a pair of laterally spaced continuous tread devices 11, 11. An inclined gathering element or loading head 12 is disposed in advance of said main frame, and a conveyer 13 extends from said gathering element rearwardly over the main frame and beyond the rear end of the latter in an overhanging position, so as to discharge material into mine cars or the like. Said conveyer is herein shown as being of a single center strand endless chain and flight type including an endless chain 14 having spaced apart flights 15, 15 secured thereto and projecting laterally therefrom in opposite directions.

The continuous tread devices 11, 11 are suitably mounted at opposite sides of the main frame on drive sprockets 17, 17 near the rear end of the frame, and on idler sprockets 18, 18 at the front of the frame. A plurality of intermediate bogie wheels 19, 19 engage the underside of the lower run of said tread devices. Said sprockets and bogie wheels are supported on suitable shafts which have bearing at their inner ends on the main frame and at their outer ends in overhanging brackets 21, 21 at opposite sides of the main frame (see Figures 4, 5, 8, 11 and 15). Details of the endless tread structures and their supporting means need not here be described further as they form no part of the present invention.

The gathering element 12, conveyer 13, and continuous tread devices 11, 11 are driven from a pair of connected motors 23, 23 mounted on opposite sides of the main frame 10, just rearwardly of the tread devices 11, 11. Said motors project laterally from opposite sides of the conveyer 13 and are each provided with a transversely extending motor shaft 24 having a motor pinion 25 on the inner end thereof. Said pinions each mesh with a spur gear 26 on the outer end of a transversely extending shaft 27. Said shafts are coaxially arranged and are journaled in housing and bearing supports 29, 29, spaced upwardly from a bottom plate 30 of the main frame 10 and herein shown as being supported thereon and secured to and projecting inwardly from the end plates of the motors 23, 23. A bevel pinion 31 is secured to the inner end of each of said shafts. Said bevel pinions mesh with a bevel gear 33 keyed to a sleeve 34, mounted on a longitudinally extending shaft 35 for free rotation with respect thereto. Said bevel gear connects said motors together to operate as a unit.

The sleeve 34 is also mounted on a ball bearing 36 mounted in a bearing support 37, suitably mounted on the main frame 10. Said sleeve has a casing 38 of a friction clutch 39 formed integrally therewith, and forms a drive means for said clutch. Said clutch is herein shown as being a friction disk clutch and is controlled by suitable fluid control means, not herein described since they are no part of my present invention, to selectively connect said bevel gear 33 and sleeve 34 to said shaft 35 and to slip to relieve said motors 23, 23 from overload conditions when the loads on said shaft are over a predetermined value.

The shaft 35 is journaled in a bearing support 40 at its forward end and forms a means for driving the gathering mechanism 12 and conveyer 13 through a universal coupling 41 and a longitudinally extending shaft 42, extending through a tubular opening 43 formed in a tank 44 for storing fluid for the fluid operating parts of the machine. A universal coupling 45 connects the forward end of said shaft with a longitudinally extending shaft 46 mounted adjacent the forward end of said main frame on ball bearings 47, 47. A bevel pinion 49 on the forward end of said shaft forms a means for driving said gathering elements and conveyer in all positions of said gathering elements with respect to said main frame, in a manner which will hereinafter be described as this specification proceeds.

It should here be noted that the tube 43 extending through the fluid storage tank 44 prevents the shaft 42 from dropping, when the shaft 35 is removed from the universal coupling 41, so said shaft may readily be connected with said universal coupling during assembly or repair of the machine, it being understood that the clutch 39 and shaft 35 are removed as a unit by sliding rearwardly along the bottom plate 30 of the main frame 10.

Figure 7:
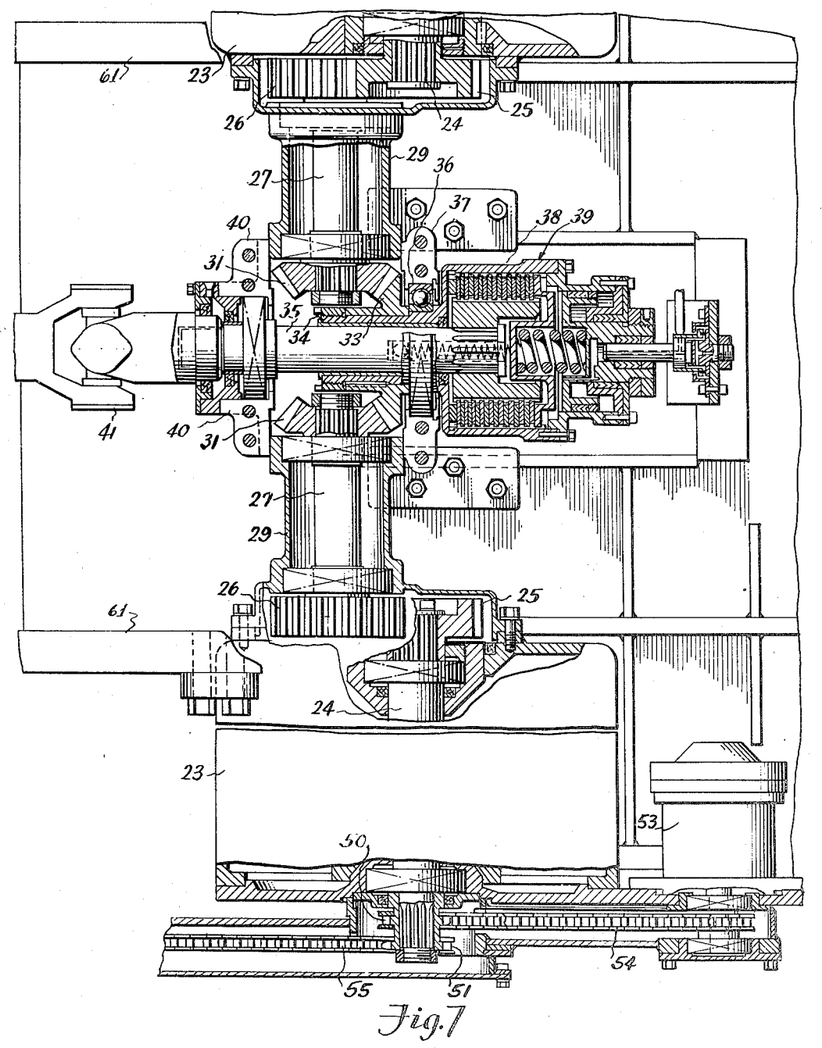
Figure 7 is an enlarged detail fragmentary plan view of the rear part of the machine, with the conveyer removed and certain parts broken away and certain other parts shown in horizontal section, in order to illustrate certain details of the drive to certain of the operating parts of the machine.
Figure 8:
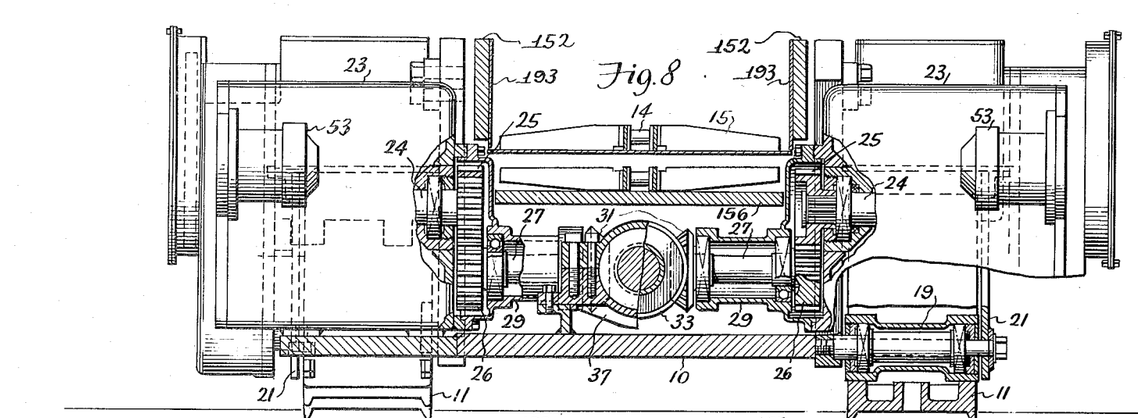
Figure 8 is a transverse sectional view illustrating certain details of the drive to certain operating parts of the machine shown in Figure 7, and illustrating certain details of construction of one of the tread devices for the machine.

The end of each motor shaft 24, opposite from the pinion 25, is splined and has a pair of integrally formed drive sprockets 50 and 51 mounted thereon. The drive sprocket 50 serves to drive a fluid pump 53 through a chain and sprocket drive 54 (see Figure 7). Said fluid pump may be of any well known form and is provided to supply fluid under pressure to the fluid operating parts of the machine.

The other drive sprocket 51 serves to drive one of the continuous tread devices through a drive chain 55, meshing therewith, and meshing with a sprocket 56 on a transversely extending shaft 57. The drive from each motor 23 to each continuous tread device is the same, so the drive to one of said tread devices only will herein be described in detail. The transverse shaft 57 is journaled in a housing and bearing support 59 on spaced ball bearings 60, 60 and extends inwardly from said sprocket towards side plate 61 of the main frame 10 (see Figures 10 and 11). Said shaft has two spur pinions 63 and 64 formed integrally therewith, the pinion 64 being of a larger diameter than the pinion 63 (see Figures 12 and 13). The inner end of said shaft is journaled in a ball bearing 65 mounted on the inner end of said housing and bearing support 59. The spur pinion 63 meshes with an idler gear 66 journaled in said housing and bearing support, and meshing with a spur gear 67, herein shown as being formed integrally with a housing 69 for a clutch 70. Said clutch housing is journaled on a transversely extending shaft 71, supported adjacent its outer end in the housing and bearing support 59, on a pair of spaced ball bearings 72, 72 and journaled at its inner end in said housing and bearing support on a ball bearing 73.

The clutch 70 may be of any well known form but, as herein shown, is of a friction disk type including a plurality of interengaging friction disks 74, 74, alternate disks of which are splined to the inner periphery of the housing 69. The other disks are splined on an inwardly projecting portion 75 of a drive member 76, keyed on the shaft 71 intermediate the ends thereof. An engaging member 77 is slidably mounted on said drive member and is adapted to engage the disks 74, 74, to cause said housing to drive said drive member in a manner well known to those skilled in the art.

The spur pinion 64 meshes with and drives a spur gear 79 herein shown as being formed integrally with the outer periphery of a casing 80 of a clutch 81, journaled on the shaft 71. Said clutch is similar to the clutch 70 and is provided with an engaging member 82, adjacent and coaxial with the engaging member 77, to engage said clutch in the usual manner and drive the drive member 76 and shaft 71 in a reverse direction from which it is driven from the clutch 70.

Figure 10:
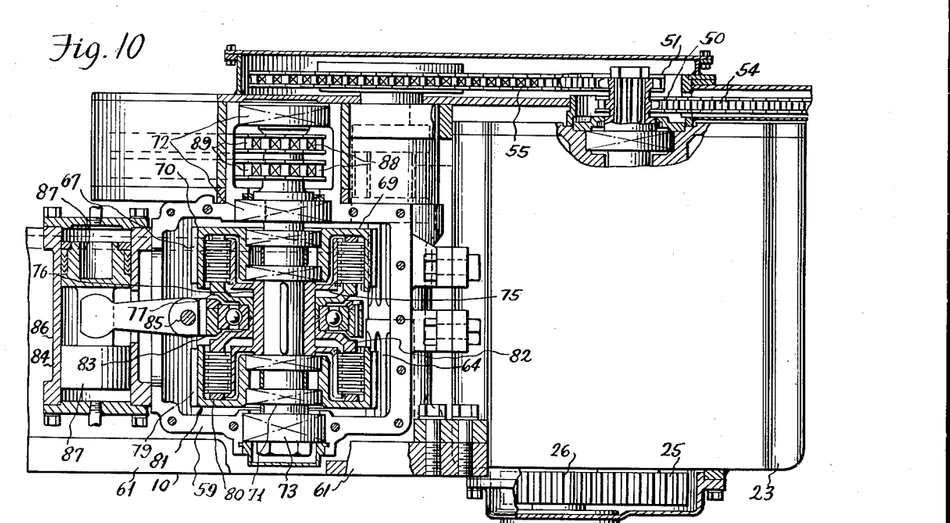
Figure 10 is an enlarged detail partial fragmentary plan view with certain parts broken away and certain other parts shown in horizontal section, showing certain details of the drive to one of the continuous tread devices.
Figure 12:
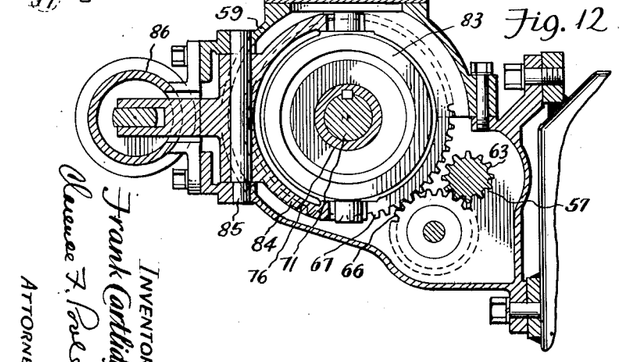
Figure 12 is a partial fragmentary longitudinal sectional view showing certain details of the drive to one of the continuous tread devices not shown in Figures 10 and 11.
Figure 13:
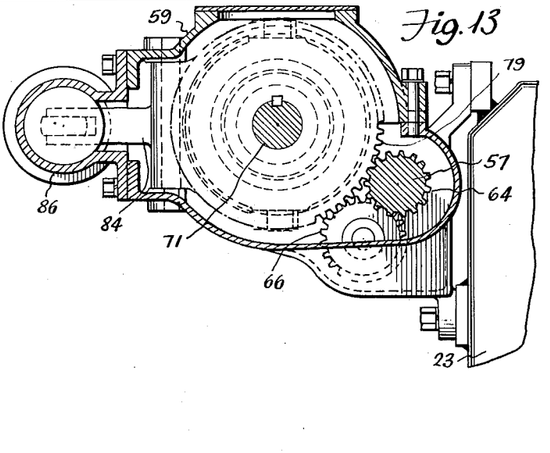
Figure 13 is a partial fragmentary longitudinal sectional view showing certain other details of the drive to one of the continuous tread devices than are shown in Figures 10, 11 and 12.

A shifting collar 83, journaled on the engaging members 77 and 82, is provided to shift said members along the drive member 76, to engage or disengage either of the clutches 70 or 81 (see Figures 10 and 12). Said shifting collar is operated by means of a clutch yoke 84, pivotally connected to opposite sides of said clutch collar and pivoted intermediate its ends on a vertical pivotal pin 85. The free end of said clutch yoke extends within a cylinder 86 and is operatively connected with a pair of connected spaced pistons 87, 87 mounted within said cylinder. Suitable fluid pressure connections are provided to opposite ends of said cylinder for operating said clutch fork and shifting yoke, so as to selectively engage one clutch and permit the other to be released to provide a simplified form of reverse drive for the shaft 71.

The shaft 71 has a pair of spaced drive sprockets 88, 88 keyed thereto between the ball bearings 72, 72. Drive chains 89, 89 meshing with said sprockets, mesh with and drive sprockets 90, 90 on the outer end of a transverse shaft 91. Said transverse shaft has the drive sprocket 17 mounted thereon, for driving said drive sprocket and the associated continuous tread device 11.

Separate fluid control valves (not shown) are provided to control the admission and release of fluid under pressure to each end of each cylinder 86, so the continuous tread devices 11, 11 may be independently driven from the motors 23, 23 in reverse directions, without reversing the direction of rotation of said motors. Said fluid control valves and the fluid connections to said cylinders will not herein be shown or described, since they form no part of my present invention.

Figure 18:
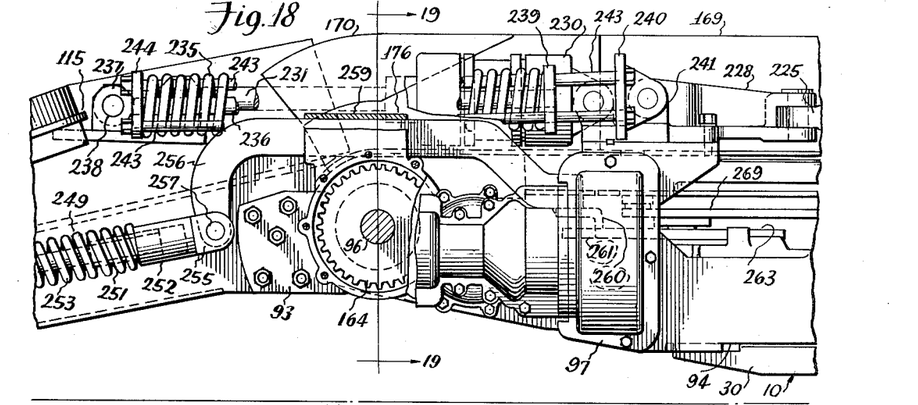
Figure 18 is an enlarged fragmentary view in side elevation of the forward part of the machine, illustrating certain details of the front part of the machine.
Figure 19:
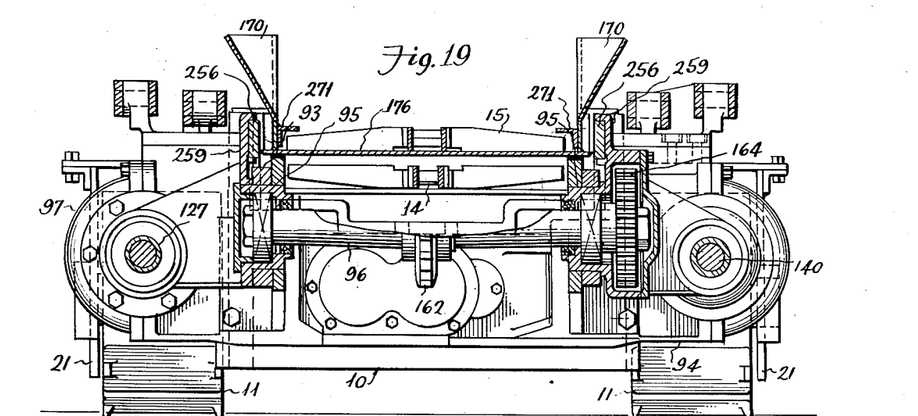
Figure 19 is a transverse sectional view taken substantially along line 19—19 of Figure 18.

The gathering and loading element 12 is supported for vertical tilting movement on a frame 93, the upper portion of which forms an inclined trough for the receiving end of the conveyer 13. Said frame is transversely pivoted adjacent its rear end on the forward end of a laterally swinging frame 94, on the outer peripheries of transversely extending bearing support bosses 95, 95, the insides of which bosses form bearing supports for a transverse drive shaft 96, coaxial with the horizontal pivotal axis of said frame 93 (see Figures 15, 18 and 19). Said transverse shaft forms a drive shaft for the conveyer chain 14.

The laterally swinging frame 94 has a widened forward portion 97 slidably mounted on and projecting forwardly of the forward end of the bottom plate 30 of the main frame 10. The rear portion of said laterally swinging portion converges to a pair of vertically spaced hollow upright bosses 98, 99. The lower of said bosses (98) is mounted on a lower end of a vertical shaft or pivot post 100, secured to the bottom plate 30 and projecting upwardly therefrom. The upper of said bosses (99) is rotatably mounted on the outside of a depending hollow boss 101, herein shown as being formed integrally with a transversely extending plate 103 extending across the upper portion of the main frame 10 (see Figure 4).

The shaft 100 is secured at its upper end to the transverse plate 103 as by a nut 104, and has a bevel gear 105 journaled thereon. Said bevel gear is meshed with and driven from the bevel pinion 49 on the forward end of the longitudinal shaft 46, and meshes with and drives a bevel pinion 107, keyed on the rear end of a longitudinal shaft 109. Said longitudinal shaft is journaled in the swinging frame 94 on ball bearings 111, 111, mounted in a bearing support 112 and in a ball bearing 113 mounted in an end cap piece 114 secured to said frame. Said shaft 109 forms a means for driving the gathering mechanism of the loader head 12 and the conveyer 13, as will hereinafter be described.

Figure 1:
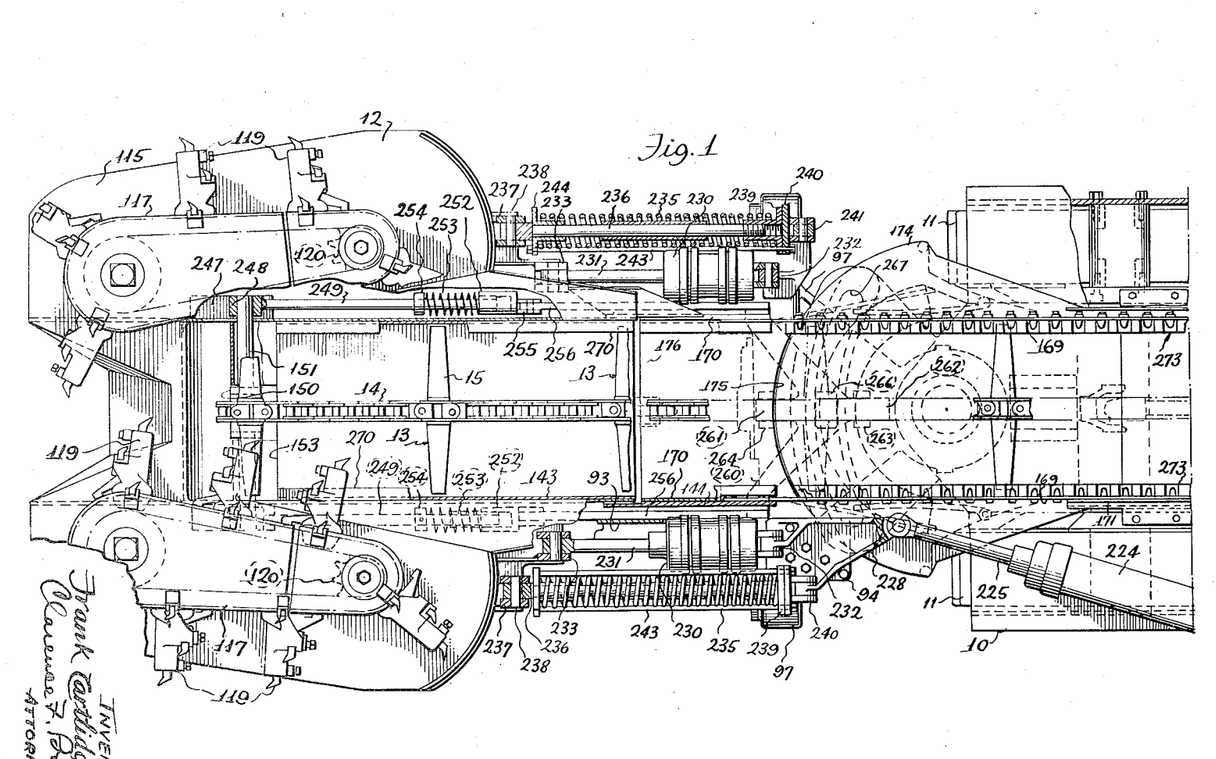
Figure 1 is a top plan view of the front part of a loading machine constructed in accordance with my invention, with certain parts broken away and certain other parts shown in section.
Figure 17:
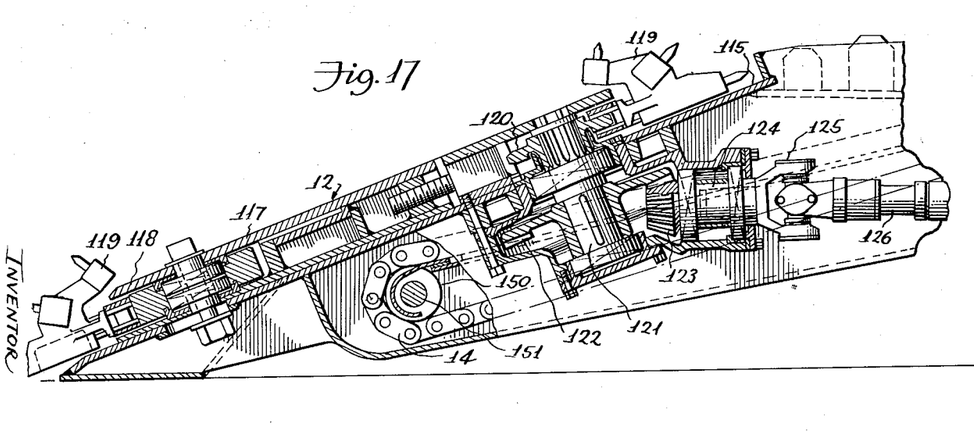
Figure 17 is an enlarged view of the front end of the machine showing certain details of the gathering mechanism and drive therefor in substantially longitudinal section.

The gathering element 12 herein shown is of a well known type and includes an inclined apron 115 mounted on the forward upper end of the intermediate frame 93 and extending thereacross and across the front end of the conveyer 13 (see Figures 1 and 17). A pair of chain guiding members 117, 117 having endless chains 118, 118 guided for orbital movement thereabout are mounted on the top side of said plate as usual, so as to extend along opposite sides of and forwardly of said conveyer. A plurality of gathering arms 119, 119 are carried by said endless chains for picking up material from the ground and moving it along the forward portion of said plate onto the conveyer.

The gathering chains 118, 118 mesh with and are driven from sprockets 120, 120, herein shown as being splined on the upper ends of vertical shafts 121, 121. Said shafts are journaled in the frame 93 beneath the apron 115 in a well known manner, and have bevel gears 122, 122 keyed thereto and meshing with and driven from bevel gears 123, 123 on the forward ends of longitudinal shafts 124, 124 (see Figure 17).

The drive to the left-hand gathering element and longitudinal shaft 124 includes a universal coupling 125 secured to the rear end of each shaft 124, for driving said shaft from an extensible drive shaft 126. The rear end of said extensible drive shaft is connected with a longitudinal shaft 127 by means of a universal coupling 129. Said longitudinal shaft 127 is journaled in a housing and bearing support 130 secured to and projecting forwardly from the forward end of the widened portion 97 of said swinging frame 94. A chain and sprocket drive 132 connects said shaft with the longitudinal shaft 109.

The drive to the right-hand gathering element is similar to the drive to the gathering element just described except that a spur gear 135 keyed on the longitudinal shaft 109 meshes with and drives a spur gear 136 on a parallel shaft 137. Said last mentioned shaft has drive connection with a parallel shaft 140, which is journaled in the right-hand widened portion 97 of the swinging frame 94 through a chain and sprocket drive indicated generally by reference character 141. The drive from said longitudinal shaft to the right-hand gathering element is the same as that just described in connection with the left-hand gathering element, so the same part numbers will be applied to like parts and the description thereof will not herein be repeated.

The conveyer 13, which extends continuously from the gathering element 12 to the rear end of the machine, consists generally of a plurality of aligned trough sections including an inclined front trough section 143 extending along the intermediate frame 93 and tiltable therewith about the axis of the transverse shaft 96; a horizontal trough section 144 mounted on and swinging laterally with the swinging frame 94; a horizontal trough section 145 fixed on and extending across the top of the main frame 10; a vertically tilting trough section 146 connected thereto on a transverse axis near the rear end of the main frame; a laterally swinging trough section 147 pivotally connected to the rear end of the trough section 146 and overhanging the rear end of the machine; and finally, an overhanging vertically tilting trough section 149 transversely pivoted to the rear end of said laterally swinging trough section 147.

Figure 3:
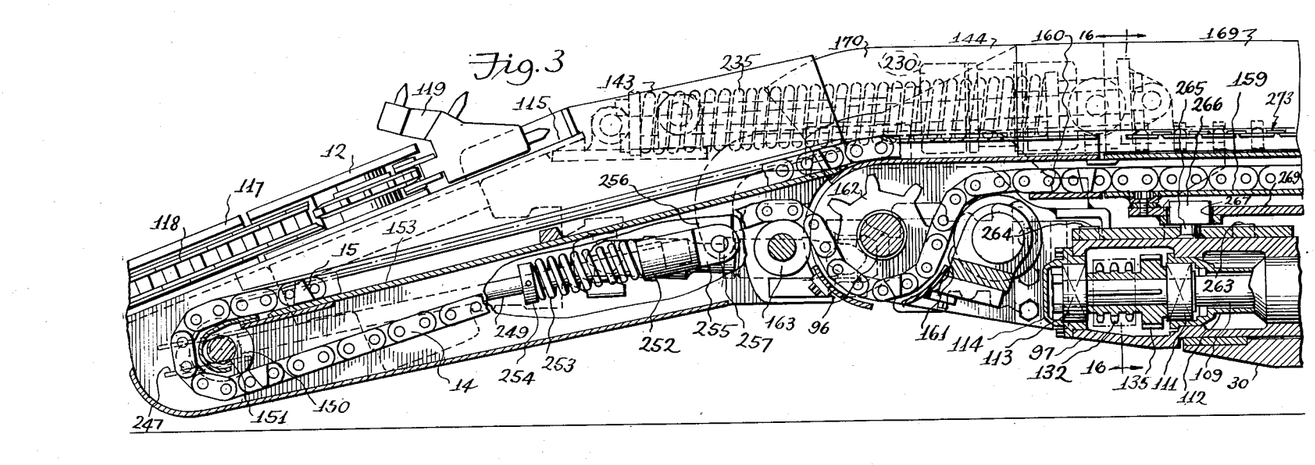
Figure 3 is an enlarged view in side elevation of the front part of the machine shown in Figure 1, with certain parts thereof shown in substantially longitudinal section.
Figure 4:
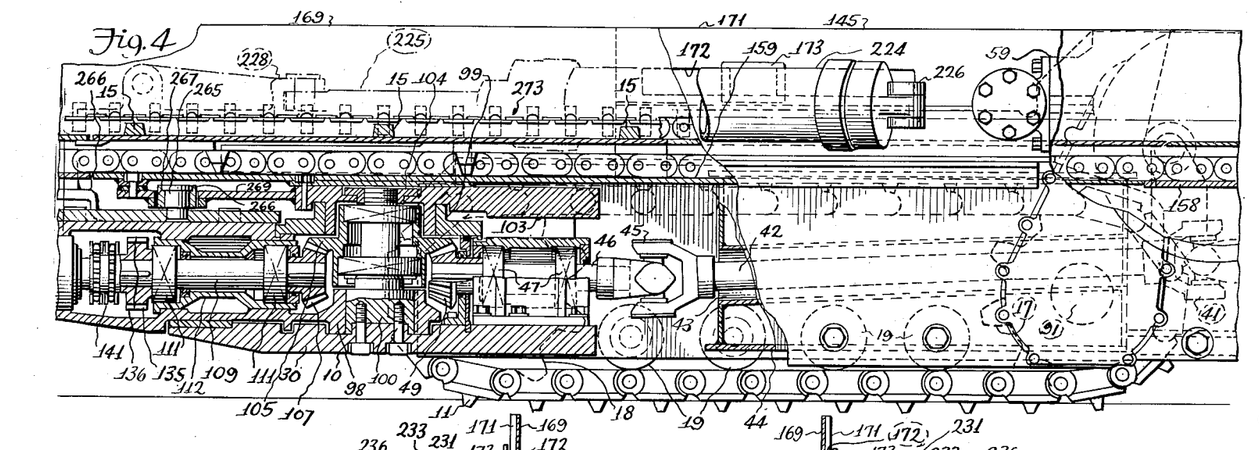
Figure 4 forms a continuation of Figure 3 and is a view in side elevation of the central part of the machine, with certain parts broken away and certain other parts shown in substantially longitudinal section.
Figure 5:
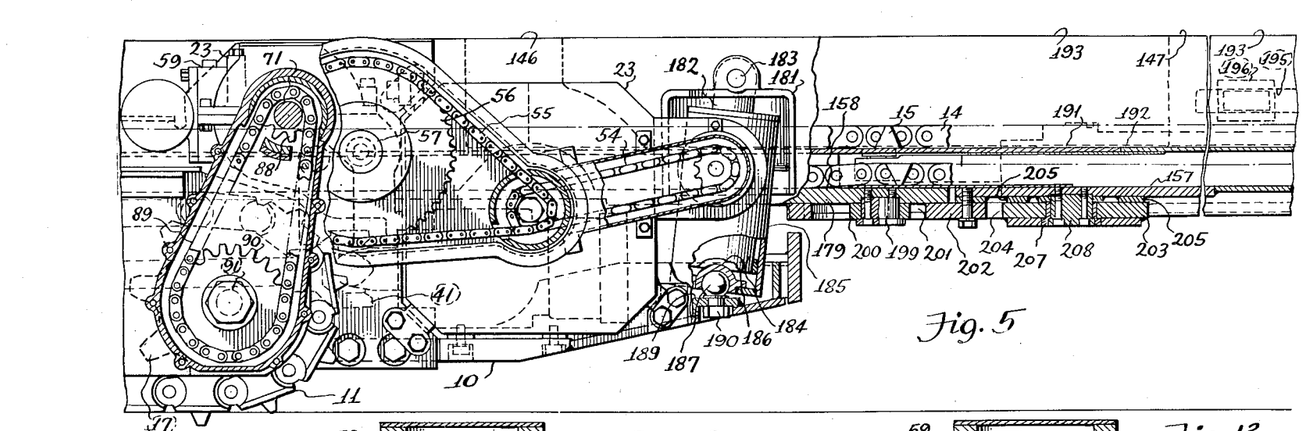
Figure 5 is a continuation of Figure 4 and is a view in side elevation of the rear part of the machine, showing certain parts of the machine broken away and certain other parts in longitudinal section.
Figure 6:
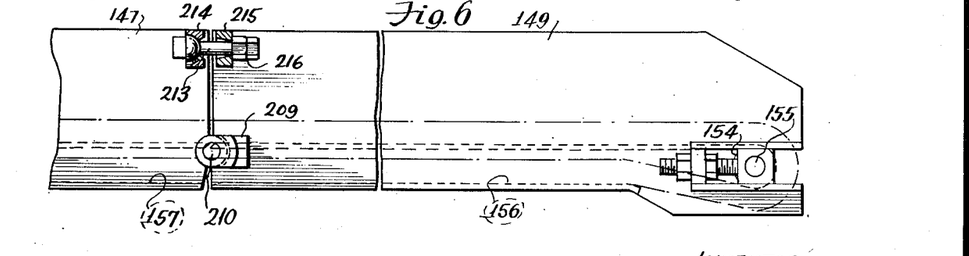
Figure 6 is a detail fragmentary view in side elevation of the rear end of the conveyer, showing certain details of the discharge end of the conveyer and forming a continuation of Figure 5, but drawn to a slightly smaller scale than Figure 5.

The endless chain 14 extends from an idler 150 mounted on a transverse shaft 151 at the front of the machine, upwardly along a bottom plate 153 of the inclined trough section 143. From thence it extends along the trough sections 144, 145, 146, 147 and 149, to and around an idler 154 on a transverse shaft 155 at the rear of the machine. Said chain reverses its direction of travel around said idler and extends forwardly from said idler beneath the bottom of the material carrying portion of the conveyer and its return run is slidably supported on a supporting plate 156, spaced beneath the material carrying portion of said vertically tilting section. From thence said chain extends along supporting plates 157, 158, 159 and 160 of the respective trough sections 147, 146, 145 and 144. Said chain extends from said last mentioned plate over an idler 161 disposed rearwardly of the transverse shaft 96 (see Figure 3). From said idler roller said chain extends downwardly and around a drive sprocket 162 keyed on said transverse shaft 96 and over an idler roller 163, to and around the idler 150 at the front end of the inclined trough 143.

Figure 15:
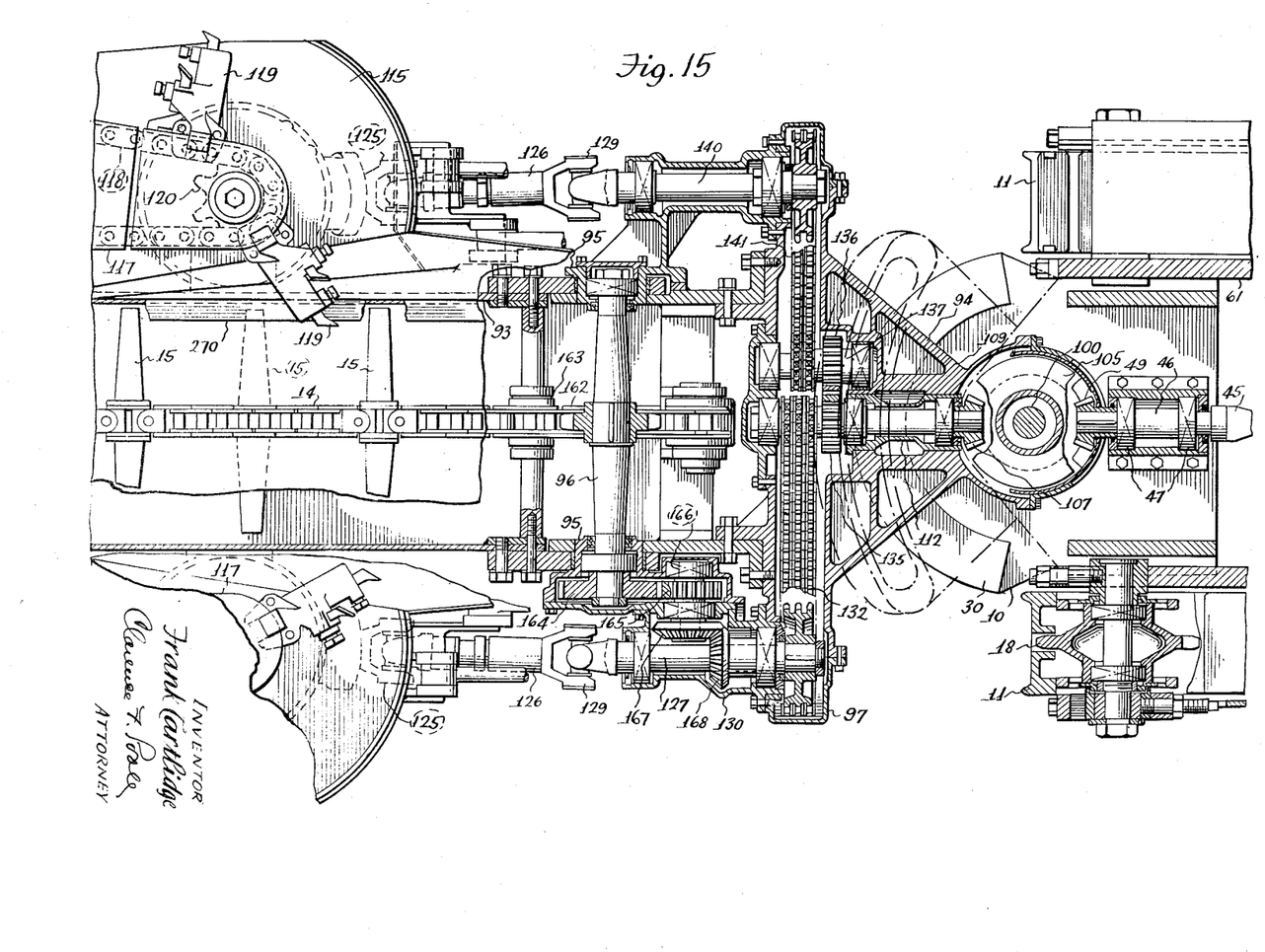
Figure 15 is an enlarged fragmentary plan view of the forward part of the machine with certain other parts broken away and shown in section than in Figures 1 and 14.

The drive to the transverse shaft 96 and drive sprocket 162 includes a spur gear 164 on said transverse shaft, which meshes with and is driven from a spur gear 165 on a parallel transverse shaft 166 disposed at the left-hand side of the machine (see Figure 15). A bevel gear 167 is keyed on the outer end of said transverse shaft and meshes with and is driven from a bevel gear 168 keyed on the longitudinal shaft 127.

Figure 16:
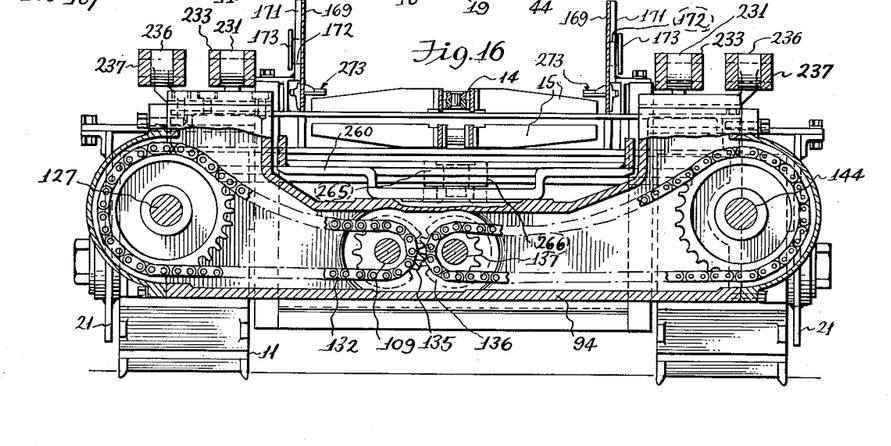
Figure 16 is a transverse sectional view taken substantially along line 16—16 of Figure 3 and illustrating certain details of the drive to the gathering mechanism.

The spaces between the side walls of the laterally swinging horizontal trough 144 and the stationary horizontal trough 145 are closed in all positions of said laterally swinging trough with respect to said horizontal trough by means of a pair of flexible side walls 169, 169. Said side walls are each secured to the inner side of side walls 170, 170 of the horizontal laterally swingable trough 144, and extend rearwardly therefrom and have slidable engagement with the inner sides of side walls 171, 171 of the stationary horizontal trough 145. Said flexible side walls are guided in longitudinally extending slots 172, 172, formed in the side walls 171, 171, by means of gibbed guide members 173, 173 extending through said slots (see Figures 4 and 16). Said guide members are secured to said flexible side walls at their inner ends and engage the outsides of said side walls 171, 171.

A bottom plate 174 of said horizontal trough 145 has a fan-shaped forward end which extends forwardly from said trough across the point of articulation of the conveyer and laterally beyond the flexible side walls 169, 169. The arcuate forward end of said bottom plate has slidable engagement with a convex arcuate face 175 of a bottom plate 176 of the laterally swinging horizontal trough 144, to provide a continuous bottom between said troughs in all positions of lateral adjustment of the gathering element 12 with respect to the main frame 10.

Figure 2:
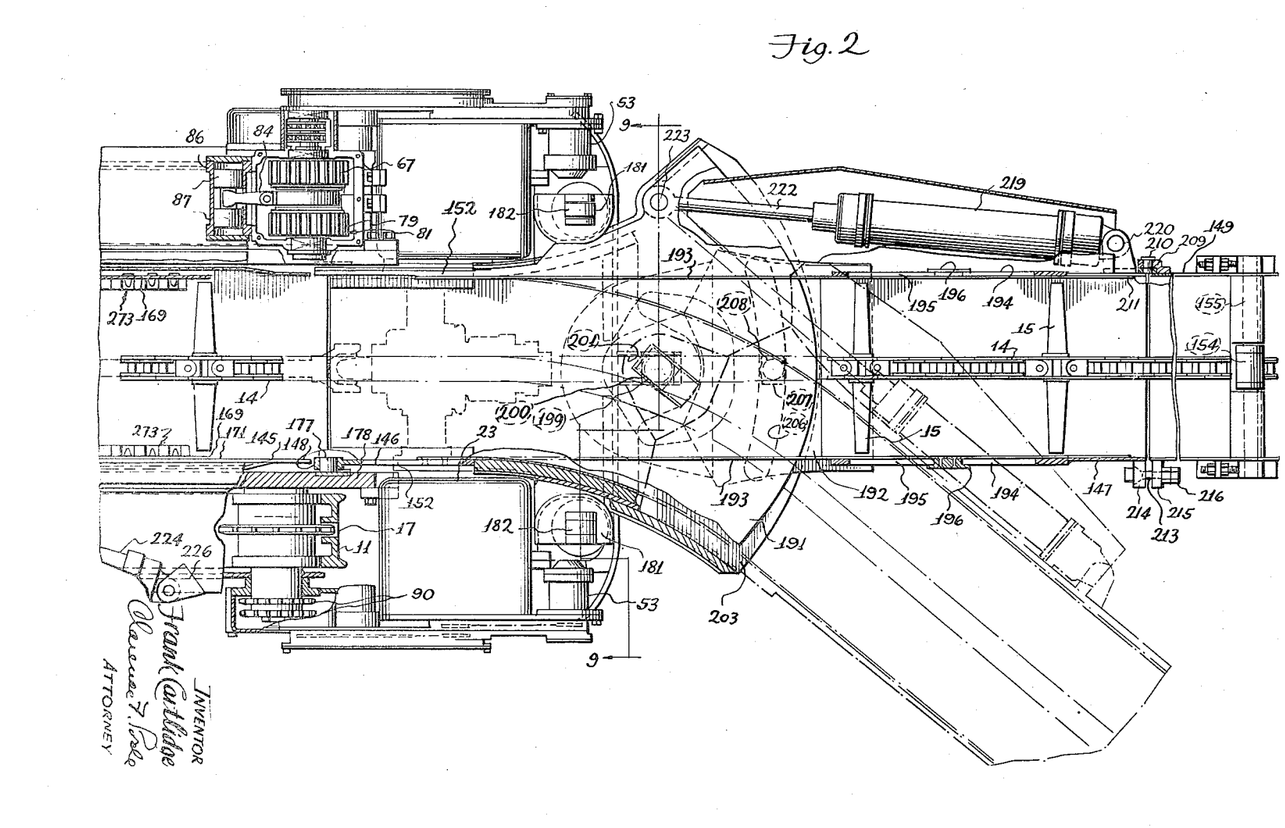
Figure 2 is a plan view of the rear part of the machine shown in Figure 1, with certain parts broken away and certain other parts shown in section, and forms a continuation of Figure 1.
Figure 11:
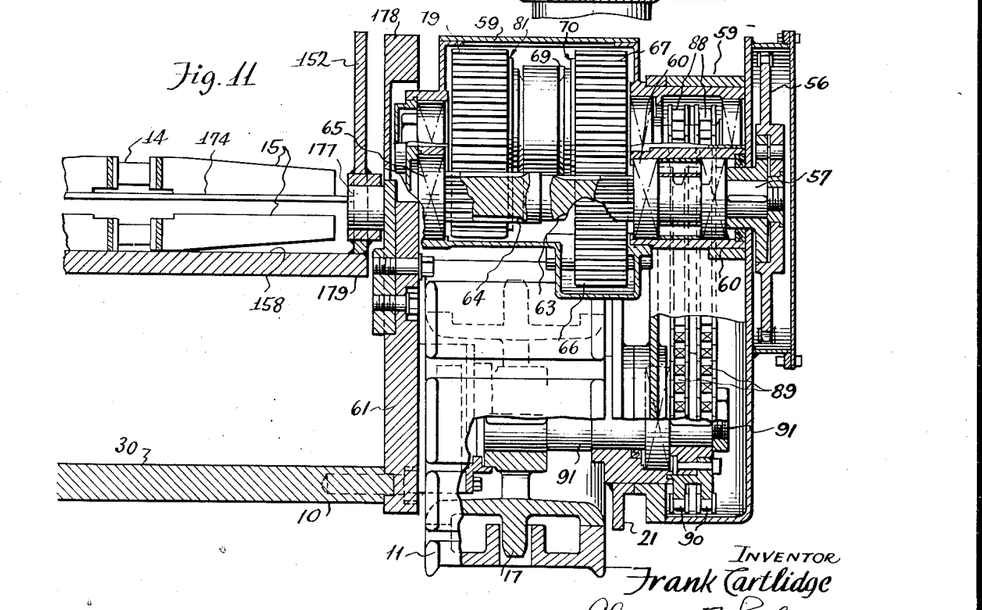
Figure 11 is a partial fragmentary transverse sectional view taken through the drive to one of the continuous tread devices and showing certain details of the machine not shown in Figure 10.

The vertically tilting trough 146 is transversely pivoted to the main frame 10 on a pair of stub shafts 177, 177 extending inwardly from upward extensions 178, 178 of the side walls 61, 61 of said main frame and mounted in bosses 148, 148 formed in side walls 152, 152 of said trough (see Figures 2 and 11).

Figure 9:
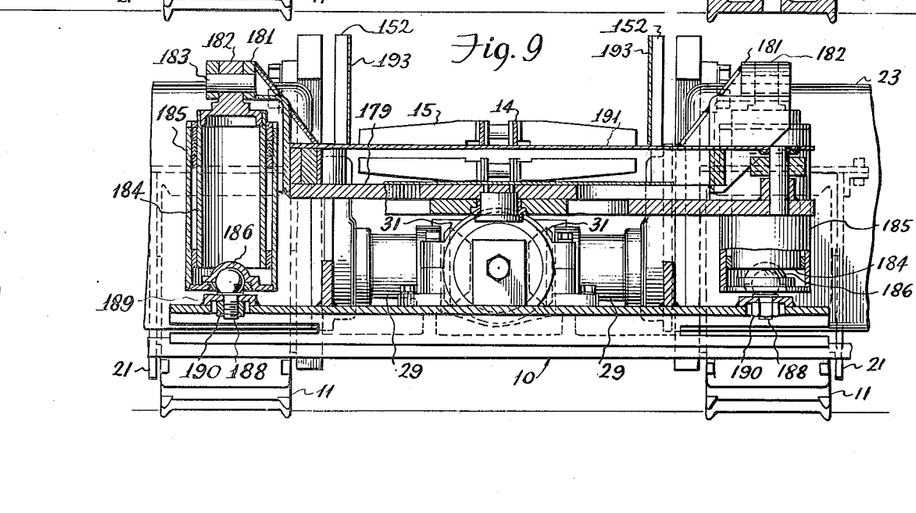
Figure 9 is a transverse sectional view taken substantially along line 9—9 of Figure 2 and illustrating certain details of the support and elevating means for the discharge end of the conveyer.

The bottom chain supporting plate 158 of said vertically tilting trough, which forms a support for the lower run of the conveyer, is part of a supplemental frame 179. Said supplemental frame extends rearwardly from the stub shafts 177, 177 beyond the rear end of the main frame 10 and forms a support for the vertically tilting trough 146 and the laterally swinging trough 147. Said supplemental frame has a pair of laterally spaced upwardly projecting bracket members 181, 181 disposed adjacent the rear end of the main frame. Each of said bracket members has the upper end of a piston rod 182 transversely pivoted thereto on a pivotal pin 183. Said piston rod is extensible from a hollow piston 184 mounted within a cylinder 185. Said cylinder has a concave spherical recessed bottom portion 186 mounted on a ball-shaped head 187 of a bolt 188. Said bolt extends through a transverse plate 189 of the main frame 10 and is secured thereto by means of a nut 190 (see Figures 5 and 9). The admission of fluid under pressure to the head ends of said cylinders will thus elevate the trough sections 146, 147 and 149 about the axes of the stub shafts 177, 177.

A bottom plate 191 of the vertically tilting trough section 146 has a rear widened fan-shaped portion extending laterally beyond the sides of said trough and forming a bottom for the rear articulated portion of the conveyer, when in all positions of articulation thereof. The arcuate rear end of said fan-shaped portion is adapted to engage a concave arcuate forward end of a bottom plate 192 of the laterally swinging trough 147. The gaps between the side walls of said troughs are closed by the flexible side walls 193, 193 engaging the insides of side walls 194, 194 of the trough section 147 in a usual manner. Said flexible side walls are guided in slotted guides 195, 195 by means of gibbed guide members 196, 196, projecting outwardly from said flexible side walls through said slotted guides and engaging the outsides of the side walls 194, 194 (see Figure 2).

The pivotal connection between the laterally swinging trough 147 and the tilting trough 146 includes a pivotal pin 199, secured to and depending from the plate 158 of the supplemental frame 179, and having a guide block 200 pivotally mounted thereon. Said guide block is slidably guided in a longitudinal slot 201 formed in a plate 202. Said plate 202 is secured to the bottom of the chain supporting plate 157 of the laterally swinging trough 147 and extends forwardly therefrom beneath the plate 158 of the frame 179, and is slidably movable with respect to said last mentioned plate. A widened supporting member 203 is secured to the bottom plate 156 and projects rearwardly therefrom. Said supporting member has a widened fan-shaped rear end disposed rearwardly of the plate 202, and has an open central portion 204 extending around said plate 202. Said support member 203 forms a support for said laterally swinging trough on flat bearing members 205, 205 extending along the bottom of the supporting plate 157 and resting on the upper side of said support member. A transversely extending arcuate guide slot 206 is formed in said support member 203, which is adapted to be engaged by a guide block 207 pivotally mounted on a stub shaft 208, secured to and depending from the bottom of the supporting plate 157, to rectilinearly move said laterally swinging trough along the guide block 200, guided in the guide slot 201, to extend or retract said trough during swinging movement thereof so as to maintain the conveyer chain 14 taut in all positions of adjustment of said laterally swinging trough.

The rear vertically tilting trough 149 is provided with a pair of brackets 209, 209 projecting laterally and forwardly from opposite sides of the forward end thereof. Pivotal pins 210, 210, extending through said brackets and through bosses 211, 211 projecting laterally from the side plates of said laterally swinging trough, are provided to pivotally connect said troughs together. Adjustment of said troughs is effected by means of bolts 213, 213. Each of said bolts has a ball-shaped head which is engaged in a ball-shaped socket formed in a lug 214 projecting laterally from a side wall of the laterally swinging trough section 147. Said bolts each extend through an apertured lug 215 projecting outwardly from a side wall of the trough 149. Adjustment is effected by means of lock nuts 216, 216 on the ends of said bolts. The discharge end of the conveyer may thus be vertically adjusted so it may be maintained in a horizontal position when the troughs 146 and 147 are in an elevated position, to keep down the height of the overhanging rear end of the conveyer, and may be tilted downwardly to extend into a mine car or like receptacle, when loading under limited headroom.

The discharge end of the conveyer is swung laterally by means of a cylinder 219 vertically pivoted to a bracket 220, projecting laterally from the right-hand side wall 194 of the laterally swinging trough section 147, adjacent the rear end thereof. A piston rod 222 extensibly mounted in said cylinder is pivotally connected at its free end to a laterally projecting portion of the support frame 203, by means of a pivotal pin 223.

The inclined trough 143 and the gathering mechanism 12 are swung laterally with respect to the main frame about the axis of connection of the hollow bosses 98 and 99 to the forwardly projecting portion of the main frame 10, by means of a cylinder 224 having a piston rod 225 extensible therefrom. Said cylinder, as herein shown, is pivotally connected at its head end to a bracket 226 projecting laterally from said main frame. Said piston rod is pivotally connected to a bracket 228 projecting upwardly from the left-hand side of the laterally swinging frame 94 (see Figures 1, 2 and 4).

The gathering element 12 and inclined trough 143 are elevated or lowered about the axis of the shaft 96 by means of a pair of laterally spaced cylinders 230, 230 having piston rods 231, 231 extensible therefrom (see Figure 1). Said cylinders, as herein shown, are transversely pivoted at their head ends to brackets 232, 232, projecting upwardly from and formed integrally with the swinging frame 94. Said piston rods are pivotally connected to brackets 233, 233 formed integrally with the frame 93 and disposed just rearwardly of the upper rear end of the apron 115.

A pair of preloaded compression springs 235, 235 are provided to tend to move the forward end of the gathering element 12 out of engagement with the ground during operation of the machine, to transmit a greater part of the weight of the gathering and loading element to the swinging frame 94, to prevent overbalancing of the machine when said gathering and loading element is in engagement with the ground. As herein shown, each of said springs encircles an eyebolt 236, transversely pivoted to a bifurcated bracket 237, by means of a pivotal pin 238. Said bifurcated bracket is herein shown as being a part of the intermediate frame 93 and is disposed adjacent the upper rear end of the inclined apron 115, outside of the trough section 143. The opposite end of said eyebolt is threaded in a flanged sleeve 239, the flange of which sleeve is abutted by the rear end of said spring. Said sleeve abuts an abutment member 240, transversely pivoted to a bracket 241, projecting upwardly from the widened portion 97 of the swinging frame 94. The flanged sleeve 239 is slidably movable with respect to said abutment member on a plurality of threaded rods 243, 243. Said rods extend through and slidably engage said abutment member and flanged sleeve and extend through the flange of a flanged collar 244 at their opposite ends. Said flanged collar is mounted on said eyebolt and abuts the eye thereof. Suitable nuts threaded on the forward ends of said rods abut the forward face of said collar. The flange of said flanged collar is abutted by the forward end of said spring. Suitable nuts threaded on the rear ends of said rods abut the rear end of the abutment member 240, to cause said rods to compress their associated spring upon lowering of the gathering element. This will cause opposite springs to tend to elevate said gathering element through said flanged sleeves 239, 239 and said eyebolts 236, 236.

It should here be noted that the elevating cylinders 230, 230 are disposed in an elevated position, but are just beneath the top of the conveyer trough 143, instead of beneath the bottom of the inclined conveyer trough, as is usual. This arrangement removes all obstructions from underneath the gathering element and the inclined elevating portion of the conveyer and provides sufficient clearance to permit the machine to pick up material from the ground, where the bottom is rough or irregular, or where the gathering element is positioned to load from a bench spaced above the bottom proper, or over obstructions on the bottom.

A means is provided to take care of the variation in length of the endless chain 14 as the inclined trough section of the conveyer is swung laterally to position the gathering element 12 to one side or the other of the truck 10. Said means includes means for moving the idler 150 longitudinally of the inclined trough 143, upon lateral swinging movement thereof. The shaft 151, upon which said idler is journaled, is slidably mounted in slots 247, 247 formed in opposite side walls of the frame 93. A collar 248 is secured to each end of said shaft. Each of said collars has a longitudinal rod 249 secured to and projecting rearwardly therefrom. The opposite ends of said rods are each slidably mounted in a sleeve 251 secured to and extending forwardly from a cylinder 252. Said cylinders and sleeves extend along the outsides of the side walls of the trough 143 and are each abutted by the rear end of a compression spring 253. Each of said springs encircles one of said rods and said sleeve and is abutted by a collar 254 at its end opposite said cylinder, which collar is suitably secured to the rod 249.

The compression springs 253, 253 are of such strength that when pressure is exerted thereon through the cylinders 252, 252, said springs will act as solid members and will only yield when overload conditions are present, as where a lump of coal or rock might get between the conveyer chain and the idler 150 or between the chain and the bottom plate 153.

Figures 14, 20, 21:
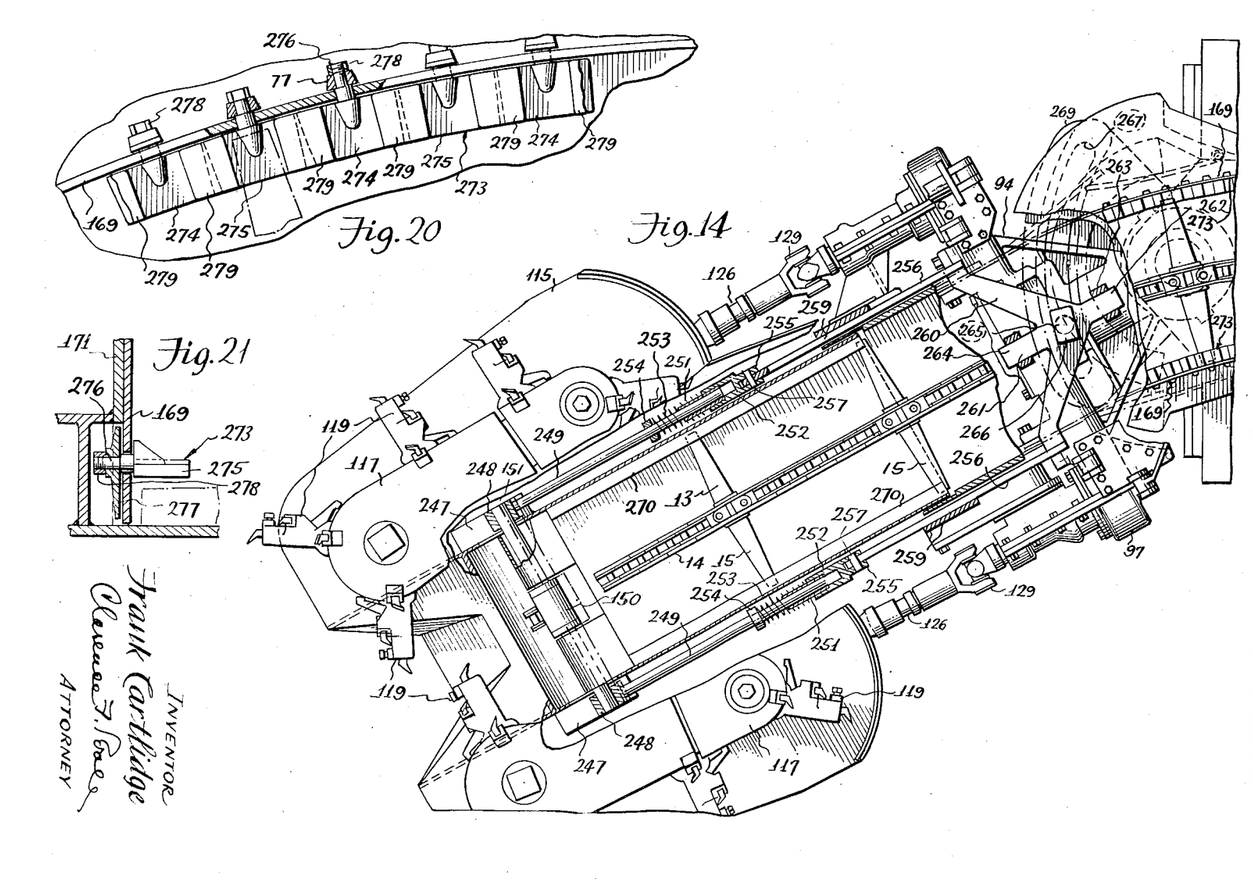
Figure 14 is a plan view somewhat similar to Figure 1, with the gathering element of the machine shown as being displaced laterally with respect to the center line of the machine, with certain other parts broken away and shown in horizontal section than in Figure 1, in order to illustrate certain details of construction of the machine, not shown in Figure 1.
Figures 20 and 21 are enlarged detail views illustrating certain details of the articulated hold-down guides for the conveyer.

Each cylinder 252 is provided with a rearwardly projecting bifurcated bracket portion 255, to which is pivotally connected a longitudinally extending link 256 by means of a pivotal pin 257. Each of said links, as herein shown, is of a substantially arch-shaped formation having a downwardly curved forward end pivotally connected to the bracket 255 and having a depending rear end secured to the outside of a member 260. Said links are each slidably guided intermediate their ends in guides 259, 259. Said guides extend along opposite outer sides of the trough section 144. Said member 260, as herein shown, is of a substantially Y-shaped formation having a link 256 secured to each end of its fork and provided with a longitudinal guide portion 261 extending forwardly from the center of its fork. A stem 262 of the Y also forms a guide portion for said member. Said guide portions are slidably guided in aligned longitudinal guides 263, 264, respectively, formed in the swinging frame 94. A pivotal pin 265 is secured to and projects upwardly from the central part of the member 260 and has a guide block 266 pivotally mounted thereon. Said guide block, as herein shown, is slidably mounted in an arcuate guide 267 formed in a plate 268 secured to and spaced beneath the bottom supporting plate 159 of the horizontal trough section 145 of the conveyer (see Figures 1, 4 and 14). As the frame 93 and inclined trough 143 of the gathering element 12 are swung from side to side, the guide block 266 will move the member 260 and links 256, 256 in a retracted position, to permit the chain to retractibly move the shaft 151 and rods 249, 249 a corresponding amount, and when said gathering element is in a longitudinally extended position, said member guided in the guide 267 will extensibly move said transverse shaft, so as to maintain a uniform tension on the conveyer chain 14 in all positions of the gathering element 12 with respect to the main frame 10.

It may be seen from the foregoing that uniform tension is maintained on the chain 14 when the trough 143 is in various positions of lateral adjustment with respect to the longitudinal axis of the machine, by moving the idlers 150 as the said trough swings laterally so the length of travel of said chain is the same in all positions of adjustment of said trough, and that this tension means permits a solid vertical pivot to be provided for the frame 93 and trough 143, so that the gathering element 12 may be rammed into a standing fall of coal by the action of the tread devices 11, 11, with sufficient force to break the coal down onto the conveyer 13.

Means are provided to overcome the tendency of the chain to twist or turn over as it reaches the top of the inclined trough 143 and turns laterally at an extreme angle, when the gathering element 12 is in engagement with the ground and said inclined trough is positioned laterally with respect to the longitudinal center line of the machine. Such a means is desirable because the chain 14, outside of its inherent lateral flexibility, is only laterally flexible at its points of connection to the flights 15, 15. This lack of lateral flexibility between the flights, together with the fact that the chain is negotiating two angles at the same time and is guided only on the ends of the flights of the conveyer, places a twisting action on the chain which is not present when the chain is turning in a lateral direction only. Said means, as herein shown, comprises a pair of angles 270, 270 secured to the inside of the side plates of the trough section 143 and extending therealong. The horizontal legs of said angles engage the upper sides of the flights 15, 15 and form a holddown means therefor.

In a like manner, a pair of angles 271, 271 extend along opposite inner sides of the side walls 170, 170 of the horizontal trough 144 of the conveyer, and a plurality of articulated holddown guides 273, 273 are secured to the inner sides of the flexible side walls 169, 169 and extend therealong. As herein shown, said articulated hold-down guides include a plurality of guide members 274, 275 loosely mounted in the flexible side wall 169 by means of bolts 276, 276 extending outwardly therefrom. An upright member 277 encircles each bolt and extends vertically along the outer side of the flexible side wall 169, while a nut 278 threaded on the end of each bolt is provided to retain said articulated hold-down guide in position. The hold-down guide 274 is provided with a pair of plates 279, 279 projecting laterally from opposite sides thereof, which are adapted to engage the upper side of a next adjacent hold-down guide 275. Said holddown guide 275, except for the plates 279, 279, is exactly like the hold-down guide 273 and is mounted in the flexible side wall 169 in the same manner as the hold-down guide 273, so will not be described further. The construction just described thus forms an articulated hold-down guide which will articulate upon flexion of the flexible side walls 169, 169, and will slidably engage the upper ends of the flights 15, 15 in all positions of articulation of the front part of the conveyer, to prevent twisting of the chain 14 when the inclined elevating trough 143 is in the extreme laterally and downwardly displaced position with respect to the horizontal stationary trough 145.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a low type loading machine, a main frame, a continuous conveyer extending from the ground in advance of said main frame over the top thereof and beyond the rear end thereof and including an inclined elevating trough extending in advance of said main frame and mounted thereon for lateral swinging movement with respect thereto about a vertical axis and for vertical adjustment with respect thereto about a transverse axis, a horizontal trough extending over the top of said main frame, flexible side walls connecting said troughs together, to form a continuous trough when said inclined trough is in various positions of adjustment with respect to said horizontal trough, an endless chain having spaced flights projecting laterally from opposite sides thereof, said flights forming a guide means on their ends for said chain and forming a material moving means for said conveyer, and means to restrain said chain from twisting when said elevating trough is at an inclined and laterally displaced position with respect to said horizontal trough including hold-down means extending along the sides of said elevating trough and adapted to engage the upper sides of said flights, and other hold-down means secured to said flexible side walls and adapted to engage the upper sides of said flights as said flights pass by the point of articulation of said conveyer.

2. In a low type loading machine, a main frame, a continuous conveyer extending from the ground in advance of said main frame over the top thereof and beyond the rear end thereof and including an inclined elevating trough extending in advance of said main frame and mounted thereon for lateral swinging movement with respect thereto about a vertical axis and for vertical adjustment with respect thereto about a transverse axis, a horizontal trough extending over the top of said main frame, flexible side walls connecting said troughs together, to form a continuous trough when said inclined trough is in various positions of adjustment with respect to said horizontal trough, an endless chain having spaced flights projecting laterally from opposite sides thereof, said flights forming a guide means on their ends for said chain and forming a material moving means for said conveyer, and means to restrain said chain from twisting when said elevating trough is at an inclined and laterally displaced position with respect to said horizontal trough including hold-down means extending along the sides of said elevating trough and adapted to engage the upper sides of said flights, and articulated hold-down means secured to said flexible side walls and adapted to engage the upper sides of said flights as they pass by the point of articulation of said conveyer.

3. In a low type loading machine, a main frame, a continuous conveyer extending from the ground in advance of said main frame over the top thereof and beyond the rear end thereof and including an inclined elevating trough extending in advance of said main frame and mounted thereon for lateral swinging movement with respect thereto about a vertical axis and for vertical adjustment with respect thereto about a transverse axis, a horizontal trough extending over the top of said main frame, flexible side walls connecting said troughs together, to form a continuous trough when said inclined trough is in various positions of adjustment with respect to said horizontal trough, an endless chain having spaced flights projecting laterally from opposite sides thereof, said flights forming a guide means on their ends for said chain and forming a material moving means for said conveyer, and means to restrain said chain from twisting when said elevating trough is at an inclined and laterally displaced position with respect to said horizontal trough including hold-down means extending along the sides of said elevating trough and adapted to engage the upper sides of said flights, and other hold-down means secured to said flexible side walls and adapted to engage the upper sides of said flights as they pass by the point of articulation of said conveyer, said last mentioned hold-down means including a plurality of inter-engaging hold-down guides mounted on said flexible side walls and extending inwardly therefrom.

4. In a low type loading machine, a main frame, a continuous conveyer extending from the ground in advance of said main frame over the top thereof and beyond the rear end thereof and including an inclined elevating trough extending in advance of said main frame and mounted thereon for lateral swinging movement with respect thereto about a vertical axis and for vertical adjustment with respect thereto about a transverse axis, a horizontal trough extending over the top of said main frame, flexible side walls connecting said troughs together, to form a continuous trough when said inclined trough is in various positions of adjustment with respect to said horizontal trough, an endless chain having flights projecting laterally from opposite sides thereof, said flights forming a guide means on their ends for said chain and forming a material moving means for said conveyer, and means to restrain said chain from twisting when said elevating trough is at an inclined and laterally displaced position with respect to said horizontal trough including hold-down guide means extending along the sides of said elevating trough and adapted to engage the upper sides of said flights, and other hold-down guide means secured to said flexible side walls and adapted to engage the upper sides of said flights as they pass by the point of articulation of said conveyer, said last mentioned hold-down guide means including a plurality of hold-down guides extending inwardly from said flexible side walls and loosely mounted thereon for pivotal movement with respect thereto about axes extending transversely of said flexible side walls, and interengaging connections between said guides, to limit pivotal movement thereof.

5. In a low type loading machine, a main frame, a pair of laterally spaced continuous tread devices for supporting and propelling said main frame, a continuous conveyer extending from the ground in advance of said main frame over the top thereof, beyond the rear end thereof, including an inclined elevating trough extending in advance of said main frame and mounted for lateral swinging movement with respect thereto and for vertical adjustment with respect thereto about a transverse axis, a central trough mounted on said frame and forming a continuation of said inclined elevating trough, and a rear discharge trough forming a continuation of said central trough, said rear discharge trough being laterally swingable about a vertical axis and being vertically adjustable about a transverse axis, an endless chain having spaced flights projecting laterally therefrom in opposite directions and movable from the forward end of said elevating trough to the rear end of said discharge trough, for conveying material therealong, said chain being guided for movement along said troughs on the ends of its flights, hold-down guide means extending along opposite sides of said elevating trough for engaging the upper sides of said flights, and other hold-down guide means extending across the point of articulation of said trough for engaging the upper sides of said flights, to prevent twisting movement of said chain when said chain, under tension, is turning in two directions, to follow said elevating trough and turn onto said central trough and said rear discharge trough.

6. In an articulated conveyer, a pair of aligned troughs, one of which is horizontally swingable with respect to the other, an endless conveyer extending along said troughs from one end of one trough to the opposite end of the other and including an idler mounted in one of said troughs, and a movable mounting for said idler arranged to rectilinearly move said idler with respect to its trough upon horizontal swinging movement of said swingable trough across the front of said stationary trough, to maintain a uniform tension on said conveyer in all positions of said swingable trough with respect to said stationary trough, said mounting including a transverse guide disposed adjacent the point of articulation of said conveyer, a control member guided therein, and operative connections between said control member and said idler, for rectilinearly moving said idler with respect to its trough upon movement of said control member along said guide.

7. In an articulated conveyer, a pair of aligned troughs, one of which is horizontally swingable with respect to the other, an endless conveyer extending along said troughs from one end of one trough to the opposite end of the other and including an idler mounted in one of said troughs, and a movable mounting for said idler arranged to rectilinearly move said idler with respect to its trough upon horizontal swinging movement of said swingable trough across the front of said stationary trough, to maintain a uniform tension on said conveyer in all positions of said swingable trough with respect to said stationary trough and including a stationary guide extending across said conveyer adjacent the point of articulation thereof, a control member slidably guided in said guide, and operative connections between said control member and said idler for rectilinearly moving said idler with respect to its trough in one direction or for permitting said chain to rectilinearly move said idler in an opposite direction upon movement of said control member along said guide.

8. In an articulated conveyer, a pair of aligned troughs, one of which is horizontally swingable with respect to the other, an endless conveyer extending along said troughs from one end of one trough to the opposite end of the other, a transverse shaft at the receiving end of said conveyer mounted in one of said troughs for longitudinal slidable movement with respect thereto, an idler on said shaft, and means connected with said shaft, for rectilinearly moving said shaft with respect to said swingable trough upon horizontal swinging movement of said swingable trough across the front of said stationary trough, for maintaining a uniform tension on said conveyer in all positions of articulation thereof including a stationary guide and operative connections between said guide and shaft.

9. In an articulated conveyer, a pair of aligned troughs, one of which is horizontally swingable with respect to the other, an endless conveyer extending along said troughs from one end of one trough to the opposite end of the other, a transverse shaft mounted at one end of said conveyor for longitudinal slidable movement with respect thereto, an idler on said shaft, and means connected with said shaft, for rectilinearly moving said shaft with respect to said swingable trough upon horizontal swinging movement of said swingable trough across the front of said stationary trough, for maintaining a uniform tension on said conveyer in all positions of articulation thereof including a stationary guide extending across said conveyer adjacent the point of articulation thereof, a control member guided in said guide for slidable movement longitudinally of said conveyer, and an operative connection between said control member and said shaft, for rectilinearly moving said shaft upon movement of said control member along said guide.

10. In an articulated conveyer, a pair of aligned troughs, one of which is horizontally swingable with respect to the other, an endless conveyer extending along said troughs from one end of one trough to the opposite end of the other, a transverse shaft mounted at one end of said conveyor for longitudinal slidable movement with respect thereto, an idler on said shaft, and means connected with said shaft, for rectilinearly moving said shaft with respect to said swingable trough, upon horizontal swinging movement of said swingable trough across the front of said stationary trough, for maintaining a uniform tension on said conveyer in all positions of articulation thereof including a stationary guide extending across said conveyer adjacent the point of articulation thereof, a control member guided for slidable movement longitudinally of said conveyer and moved longitudinally of said conveyer by said guide, and an operative connection between said control member and said shaft, for moving said shaft with said control member, said operative connection being yieldable, to permit yieldable movement of said shaft and idler with respect to said trough, to prevent fouling of said conveyer when a lump of material lodges between said conveyer and idler or between the flights of said conveyer and the bottom of said troughs.

11. In an articulated conveyer, a pair of aligned troughs, one of which is horizontally swingable with respect to the other, an endless conveyer extending along said troughs from one end of one trough to the opposite end of the other including a center strand endless chain having flights projecting laterally therefrom and an idler at the receiving end of said conveyer about which said endless chain is adapted to reverse its direction of travel, and a controlling connection to said idler arranged to positively move said idler with respect to said trough, upon movement of said swingable trough across the front of said stationary trough, to maintain a uniform tension on said conveyer in all positions of adjustment of said movable trough with respect to said stationary trough, including a stationary guide extending across said conveyer adjacent the point of articulation thereof, a control member having connection with said guide and guided for movement longitudinally of said movable trough, and an operative connection between said control member and said idler for rectilinearly moving said idler with said control member in one direction or for permitting said chain to move said idler in an opposite direction upon lateral swinging movement of said trough across the front of said stationary trough.

12. In an articulated conveyer, a pair of aligned troughs, one of which is horizontally swingable with respect to the other, an endless conveyer extending along said troughs from one end of one trough to the opposite end of the other including a center strand endless chain having flights projecting laterally therefrom and an idler at the receiving end of said conveyer about which said endless chain is adapted to reverse its direction of travel, and a controlling connection to said idler arranged to permit said chain to retractibly move said idler with respect to said troughs upon articulation of said conveyer and to positively extend said idler upon movement of said swingable trough to an aligned position with respect to said movable trough, to maintain a uniform tension on said conveyer in all positions of adjustment of said movable trough with respect to said stationary trough, including a stationary guide extending across said conveyer adjacent the point of articulation thereof, a control member having connection with said guide and guided for movement longitudinally of said movable trough, and a connection between said control member and said idler for rectilinearly moving said idler with said control member, said connection including a yieldable member of sufficient strength to cause said connection to normally be a solid member, but to permit yieldable movement of said idler and prevent fouling of the conveyer when a lump of unbreakable material lodges between said chain and idler, or between said chain and the bottom of said conveyer.

13. In a low type loading machine, a main frame, means for supporting and propelling said main frame, a conveyer extending from the ground in advance of said main frame over the rear end thereof and including an inclined elevating trough having gathering mechanism on the forward end thereof, and another trough extending along the top of said main frame beyond the rear end thereof, a center strand endless chain guided for movement along said troughs and having flights projecting laterally therefrom, for conveying material therealong, an idler at the forward end of said inclined elevating trough and forming a direction changing member for said chain, and rigid pivotal mountings for said inclined elevating trough on said main frame for mounting said inclined elevating trough for movement about both horizontal and vertical axes, and means for maintaining a uniform tension on said chain upon swinging movement of said elevating trough across the front of said main frame, so arranged as not to be affected when said gathering element is engaged with the coal face with sufficient force to break down the coal thereon including means for positively moving said idler with respect to said trough during swinging movement of said trough across the front of said main frame.

14. In a low type loading machine, a main frame, means for supporting and propelling said main frame, a conveyer extending from the ground in advance of said main frame over the rear end thereof and including an inclined elevating trough having gathering mechanism on the forward end thereof, and mounted on said main frame for movement with respect thereto about both horizontal and vertical axes, and another trough extending along the top of said main frame beyond the rear end thereof, a center strand endless chain guided for movement along said troughs and having flights projecting laterally therefrom, for conveying material therealong, an idler at the forward end of said inclined elevating trough and forming a direction changing member for said chain, and means for maintaining a uniform tension on said chain upon swinging movement of said elevatig trough across the front of said main frame so arranged as to permit said gathering element to be engaged with a coal face with sufficient force to break down the coal thereon including a stationary guide extending across said conveyer, adjacent the point of articulation thereof, a control member guided for slidable movement longitudinally of said conveyer and moved longitudinally of said conveyer by said guide upon lateral swinging movement of said conveyer, and an operative connection between said control member and said idler, for moving said idler with said control member upon lateral movement of said trough.

15. In a low type loading machine, a main frame, a continuous conveyer extending from the ground in advance of said main frame over the top thereof and beyond the rear end thereof and including an inclined elevating trough extending in advance of said main frame and mounted thereon for lateral swinging movement with respect thereto about a vertical axis and for vertical adjustment with respect thereto about a transverse axis, a horizontal trough extending over the top of said main frame, flexible side walls connecting said troughs together, to form a continuous trough when said inclined trough is in various positions of adjustment with respect to said horizontal trough, an endless chain having spaced flights projecting laterally from opposite sides thereof, said flights forming a guide means on their ends for said chain and forming a material moving means for said conveyer, and means to restrain said chain from twisting when said elevating trough is at an inclined and laterally displaced position with respect to said horizontal trough including hold-down means secured to said flexible side walls and adapted to engage the upper sides of said flights as said flights pass by the point of articulation of said conveyer.

16. In a low type loading machine, a main frame, a continuous conveyer extending from the ground in advance of said main frame over the top thereof and beyond the rear end thereof and including an inclined elevating trough extending in advance of said main frame and mounted thereon for lateral swinging movement with respect thereto about a vertical axis and for vertical adjustment with respect thereto about a transverse axis, a horizontal trough extending over the top of said main frame, flexible side walls connecting said troughs together, to form a continuous trough when said inclined trough is in various positions of adjustment with respect to said horizontal trough, an endless chain having spaced flights projecting laterally from opposite sides thereof, said flights forming a guide means on their ends for said chain and forming a material moving means for said conveyer, and means to restrain said chain from twisting when said elevating trough is at an inclined and laterally displaced position with respect to said horizontal trough including articulated hold-down means secured to said flexible side walls and adapted to engage the upper sides of said flights as they pass by the point of articulation of said conveyer.

FRANK CARTLIDGE.